United States Patent Office 3,711,485
Patented Jan. 16, 1973

3,711,485
METHOD FOR EXTRACTION OF THE OCOTEA ALKALOID, GLAZIOVINE
Giorgio Ferrari, 8 via Lario, Milan, Italy, and Cesare Casagrande, 13 via per Brunate, Como, Italy
Continuation-in-part of application Ser. No. 676,054, Oct. 18, 1967. This application Oct. 7, 1970, Ser. No. 78,766
Int. Cl. C07d 33/38
U.S. Cl. 260—289 A               4 Claims

ABSTRACT OF THE DISCLOSURE

Crystalline glaziovine having the formula:

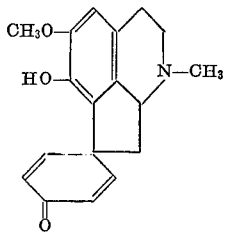

and its acid addition salts have psychotropic properties useful in therapeutic compositions for the relief of anxiety. The alkaloid is obtained by extraction of the bark and leaves of the genus Ocotea (Lauraceae), species glaziovii.

CROSS REFERENCE TO RELATED APPLICATION

This application is a continuation-in-part application of our copending application, Ser. No. 676,054 filed Oct. 18, 1967, now abandoned.

The present invention relates to alkaloids and to therapeutic compositions containing said alkaloids. More particularly, the present invention relates to glaziovine, a crystalline alkaloid of plants of the genus Ocotea (Lauraceae), a method for obtaining said alkaloid and therapeutic compositions containing glaziovine or salts thereof and having useful psychotropic properties.

Glaziovine has a structure which is represented by the following formula:

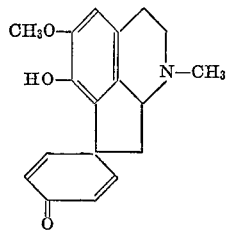

Glaziovine is extracted from plants of *Ocotea glaziovii* Mez. a Brazilian Lauracea which is also known by the local names of "canela amarela," "canela pereira" or "canela ameixa." The plants grow in the Guanabara State of Brazil, and have been investigated by several botanists. The Brazilian botanist Ida de Vattimo has summarized the knowledge about *Ocotea glaziovii* describing in full detail the anatomy of the different parts of the plant and several locations in the Guanabara State where the plant may be observed and collected [Ida de Vattimo, Rodriquesia, Revista do Jardim Botanico, Rio de Janeiro 25 (37) 96, 1966, and Arquivos do Jardim Botanico, Rio de Janeiro 17 209]. The leaves and bark of the branches of *Ocotea glaziovii* are used for the extraction of the alkaloid.

The glaziovine alkaloid has been described in literature and has been obtained by laboratory procedures. It has not heretofore been known, however, that glaziovine exhibits pharmacological or psychotropic properties. It has also not heretofore been possible to obtain glaziovine of high purity by an industrially practicable process or in sufficient quantities for pharmaceutical use.

It is therefore an object of the present invention to provide a method of obtaining the alkaloid glaziovine of a high degree of purity by an industrially practicable process.

It is a further object of the present invention to provide therapeutic compositions containing glaziovine and exhibiting pharmacological and psychotropic properties.

It is another object of the present invention to provide a method for the relief of anxiety in humans by the use of such therapeutic compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects can be attained in accordance with the present invention. The ground leaves and bark of the plant are extracted at a temperature of from 20° to 60° C. with a lower alkanol, e.g. methanol, ethanol, propanol, etc., until removal of the alkaloidal material is complete. The residue obtained by concentrating the alcoholic extract, for example under reduced pressure, e.g. in vacuo, at a temperature not exceeding 50° C., is taken up with a dilute lower alkanoic acid having 1–3 carbon atoms, and preferably with dilute acetic acid (5% to 20% aqueous solution). The acid solution is decanted from the viscous precipitate and the precipitate is taken up successively several times with dilute alkanoic acid of gradually decreasing strength, e.g. with 10% down to 2% aqueous acetic acid, until the alkaloid is completely extracted as indicated by Mayer reagent. The combined filtered acid extracts are made basic by adjusting the pH to a value of from 8 to 9 with a base, e.g. ammonia, sodium carbonate, potassium carbonate, sodium hydroxide, potassium hydroxide, etc., and then thoroughly extracted with a chlorinated aliphatic hydrocarbon having a boiling point below 130° C., e.g. chloroform, methylene chloride, tetrachloroethylene, etc. The combined extracts are washed with water, dried over anhydrous sodium sulfate, and concentrated by evaporation. The concentrated solution is then extracted again repeatedly with dilute alkanoic acid, e.g. acetic acid. The combined acid extracts are made basic as described above and again extracted repeatedly with water, dried over anhydrous sodium sulfate, and evaporated to dryness under reduced pressure, e.g. in vacuo.

The alkaloidal material obtained in the above manner is purified by hot washing, e.g., by keeping it for one hour in boiling ethyl ether. The ether suspension is cooled and filtered. The ether filtrate is discarded while the residue obtained on the filter is dried, then dissolved in twice its weight of boiling lower alkanol, e.g. methanol, and crystallized from this solution. The recovery of the crystallized alkaloid is carried out in an inert gas atmosphere, e.g. nitrogen.

Cooling the methanolic solution to 0° C. yields a crystalline alkaloidal product which is further purified by two successive recrystallizations from a chloroform-acetone solution (chloroform:acetone=1:2 by volume). The resulting crystalline product is pure glaziovine and melts at 234–236° C. (dec.). It is obtained in the form of colorless needles and is soluble e.g. in chloroform, methylene chloride, and hot alcoholic solutions but is only slightly soluble in ether, acetone, and ethyl acetate. Its ultraviolet absorption spectrum in ethanol exhibits a characteristic maximum at λ 288 μm. (log ε3.57). The infrared absorption spectrum obtained in a KBr disc exhibits the following principal bands (wave lengths expressed in microns): 6.0, 6.15, 6.65, 7.8 and 11.6.

The drawing shows the infrared absorption spectrum of the glaziovine alkaloid of the present invention obtained in a KBr disc.

Glaziovine forms a picrate which crystallizes from alcohol and melts at 199°–203° C.

The new alkaloid of this invention has psychotropic effects as demonstrated in laboratory animals after doses from 10 mcg. to mg./kg. orally. For example, glaziovine when administered to Swiss albino mice in oral doses of 0.1 mg./kg. and 1 mg./kg. markedly reduced the spontaneous motility of the animals in oscillating cages. Reductions of 48% and 38% respectively, in comparison with a control group of untreated mice was observed with the said doses. Glaziovine in the same doses and experimental conditions also counteracted the hypermotility induced in mice by the intraperitoneal injection of 10 mg./kg. of amphetamine sulfate. Reduction of hypermotility of 19% and 45%, respectively, were observed in comparison with a group of animals treated only with the amphetamine sulfate.

Glaziovine is also active in prolonging barbiturate hypnosis. The sleeping time of Swiss albino mice after intraperitoneal injections of 50 mg./kg. of pentobarbital was increased to 45%, 90% and 20% respectively by oral doses of 0.01, 0.1 and 1 mg./kg. of the alkaloid. Again, the comparison was made with a group of mice which had received only pentobarbital. It was noticed with interest that doses of 25 mg./kg. of glaziovine did not modify the sleeping time in this test.

As stated above, glaziovine has now been found to show pharmacological effects in rats. For example, in rats submitted to luminous and acoustic stimuli (open field test, Jansen et al., Psychopharmacologia 1, 389, 1960), the motility induced by the stimulus (reactive motility) was reduced by 53% and 19% in comparison with untreated animals in Sprague Dowley rats which had been given an oral dose of the alkaloid of 0.01 and 0.1 mg./kg., respectively. Also in this test an oral dose of 25 mg./kg. of glaziovine did not show any effect.

Glaziovine did not modify the conditioned avoidance reaction of rats in the pole climbing test described by Maffii (Arch. Fisiol. 59, 85, 1959). In this respect, glaziovine appears different from neuroleptic drugs (e.g. chloropromazine) which are particularly active in this test. Glaziovine appeared devoid of myorelaxant effect in the test of Fleury (Arch. Sci. 10, 107, 1957) on mice, thus differing from diazepam, a widely known benzodiazepine tranquillizens, which at the same dosage caused a marked myorelaxant effect.

The other pharmacological properties of glaziovine are not particularly significant, thus excluding the possibility of adverse side effects. In fact, the alkaloid is devoid of local anaesthetic and analgesic effects and does not modify body temperature. It exhibits "in vitro" a positive inotropic effect on the rabbit atrium and a stimulating effect on the rabbit ileum and uterus. The only significant effects "in vivo" are a slight reduction in blood pressure accompanied by an increase in the amplitude and frequency of respiratory movements. A positive inotropic effect is also evident in the open chest dog heart preparation. All of these effects become evident when much higher doses are administered than those which are active on the central nervous system.

Glaziovine shows very low toxicity in laboratory animals. Acute $LD_{50}$ in rats and mice is 1000 times higher when the drug is administered orally and 150 times higher when it is given intravenously than the doses suggested for therapeutic use. In rats and dogs chronic oral treatment with a daily dose 20–100 times higher than that used with humans did not show any toxic effect on body weight, behaviour or haematological parameters. The major organs of treated animals did not show any significant microscopic alterations. Foetal toxicity tests were carried out on rats, rabbits and dogs. Glaziovine did not cause any toxic effects on the foeti.

The above pharmacological data indicates that glaziovine is endowed with useful tranquillizing and antianxiety properties. The lack of myorelaxant effects can also be regarded as a favourable characteristic of glaziovine. The absence of depressant effects at high doses indicates that glaziovine can be safely used.

For therapeutic use, the alkaloid may be formulated into pharmaceutical compositions comprising, as active principle, the new crystalline alkaloid or a non-toxic pharmaceutically acceptable acid addition salt thereof, and a physiologically compatible excipient. The thus obtained preparations may be administered internally, e.g., in the form of tablets, dragees, capsules, solutions, or suspensions, in appropriate doses. Adequate excipients for said preparations may be either solids or liquids.

If a solid excipient is desired, the pure crystalline alkaloid is mixed with a conventional excipient such as talc, mannitol, lactose, starch, magnesium stearate, or polyvinyl-pyrroildone. Granulation is carried out to yield a powder which may be compressed into tablets. These tablets may be coated with sugar so that dragees will be formed. Mixed with such excipients, the alkaloid may also be made available in the form of gelatin capsules.

As stated hereinabove, the free alkaloid base may also be used in the form of an addition salt with a non-toxic pharmaceutically acceptable acid. For example, organic acids such as acetic, maleic, fumaric, tartaric, citric, ascorbic, benzoic, methane-sulfonic, and similar acids, react with the free base to yield the corresponding salts. Due to their solubility in water, said organic glaziovine salts are particularly suitable for the preparation of pharmaceutical formulations which can be administered parenterally in the form of ampules. Distilled water or physiological saline solutions are suitable excipients for such preparations. Other suitable liquid carriers include peanut and other vegetable oils which may be mixed with the alkaloid or its salts and filled into gelatin capsules or further mixed with water to give a solution or suspension.

Suitable preservatives, such as antioxidants for example, may be added to both solid and liquid excipients in order to stabilize the active component incorporated in the pharmaceutical preparations. Hydroquinone, for example, might be used as one of such antioxidants.

The pharmaecutical compositions of the present invention are prepared so as to provide dose amounts of from 10 mcg. to 50 mg./kg. of body weight of the treated subject. Preferably the dose amounts are from 0.2 to 0.5 mg./kg. of body weight. It is also preferred to administer the dose amount in from 1 to 3 separate tablets, capsules, dragees or ampules.

The pharmaceutical preparations containing glaziovine and its salts have proven to be particularly useful in the treatment of states of anxiety, psychoneurosis, and especially reactive, depressive psychoneurosis.

Glaziovine was administered to 70 patents in a psychiatric hospital. The group studied consisted of 50 females and 20 males whose ages ranged between 20 and 80 years. Each patient was treated with the alkaloid over a period of at least 14 days. In 14 patients a double-blind study of glaziovine and a placebo was carried out for a week in order to obtain a statistical analysis. The dose used was 30 mg. per diem divided into 3 single doses of 10 mg. each. Previous investigations had shown that this dose was most effective, since higher dosages tended to bring about insomnia and restlessness. The patients were divided into 3 groups:

Group 1: 30 subjects suffering from psychoneurosis with dominant anxiety.

Group 2: 30 subjects with depressive, phobic and cenestopathic psychoneurosis with anxiety.

Group 3: 10 subjects with arteriosclerotic neurasthenic syndromes associated with anxiety.

The following results were obtained:

Group 1: in 23 patents, glaziovine brought about a marked reduction in anxiety with a feeling of general well-being; in some cases it was possible to eliminate anxiety.

Group 2: in these subjects, even though it did not act directly on the basic symptoms, the drug showed some positive effects on the anxiety which is always characteristic of such diseases. In this group anxiety was reduced in 18 cases.

Group 3: favourable results were obtained in 7 cases. In none of the treated patients did glaziovine show any significant side-effects, particularly as regards cardiac and respiratory rate, blood glucose, nitrogen and the liver function test.

A statistical analysis of the results was carried out. The sequential analysis enabled a significant difference to be observed between the effect of the drug and that of the placebo, glaziovine being more effective than the placebo in every case. In conclusion, the results obtained in this clinical investigation have shown that glaziovine shows from good to excellent antianxiety effects on the majority of the subjects treated. Its action differs from that of drugs traditionally used in the treatment of anxiety states in that it lacks the muscle relaxant properties which characterize meprobamate and benzodiazepine derivatives. Glaziovine did not exert any significant effect on sleep nor did it show the excitant action generally observed after administering conventional antidepressants.

The following examples illustrate a preferred method used for the extraction of glaziovine and for the formulation of the latter for therapeutic use. It is to be understood that the examples are illustrative only and do not limit the invention in any way.

EXAMPLE 1

78 kg. of dry, crushed leaves of *Ocotea glaziovii* were extracted with ethyl alcohol at 20–25° C. until the alcohol showed a negative Mayer reaction for alkaloids. The combined alcohol extracts were concentrated in vacuo at a temperature of maximally 45° C. until a liquid of syrupy consistency was obtained. The residue which measured 15 liters was diluted with a 10% aqueous acetic acid solution. The aqueous acid phase was decanted from the gum which precipitated and the latter was diluted with one liter of hot alcohol and 10 liters of 5% aqueous acetic was added. This operation was repeated, generally four times, until the Mayer reaction was negative. The combined acid extracts measuring approximately 65 liters were alkalized to adjust the pH to 8.5 by the addition of concentrated ammonia and the obtained precipitate was separated by centrifugation. This precipitate was stirred with 15 liters of chloroform for one night. The suspension was centrifuged, and the residue was dissolved in one liter of hot alcohol and taken up by five liters of chloroform. The chloroform phase combined with the principal phase while the treatment with chloroform was repeated with the new precipitate until Mayer's reaction was negative (with respect to the residue). The combined chloroform extracts were washed by shaking them twice with water; subsequently, they were dried on anhydrous sodium sulfate and evaporated in vacuo at maximally 45° C. to yield a volume of 3.5 liters. The concentrate was extracted several times with a 10% dilute acetic acid solution until Mayer's reaction was negative. The new combined acetic acid extracts were alkalized with aqueous ammonia as described above and extracted three times with 1.3 liters of chloroform. The combined chloroform extracts were washed three times with water, dried on anhydrous sodium sulfate, and evaporated to dryness in vacuo at maximally 45° C. The residue consisting of approximately 600 grams of alkaloidal materials was boiled with 2.1 liters of either under reflux for one hour, and then cooled and filtered. The new residue, approximately 300 grams, was heated with stirring, with methanol at 50° C. for fifteen minutes. The process was carried out under nitrogen. The substance was then cooled and filtered, resulting in approximately 200 grams of crude glaziovine which was purified, in order to obtain it in a very pure form, by crystallizing it twice successively from chloroform: acetone=1:2 in a nitrogen atmosphere. The approximately 160 grams of pure glaziovine obtained in this manner consisted of colorless needles which melted at 234°–236° C. (dec.). It proved to be homogeneous when subjected to thin-layer chromatography.

*Analysis.*—Cald. for $C_{18}H_{19}NO_3$ (percent): C, 72.7; H, 6.4; N, 4.7; 1 $OCH_3$, 10.4. Found (percent): C, 72.5; H, 6.5; N, 4.9; 1 $OCH_3$, 10.5.

The U.V. spectrum of glaziovine in ethanol showed a maximum at 288 $\mu$m. (log $\epsilon$=3.57). The I.R. spectrum of glaziovine, in chloroform solution, showed the following principal bands: 6.0, 6.15, 6.65, 7.8, 11.6$\mu$.

EXAMPLE 2

125 grams of glaziovine was mixed with 460 grams of lactose, 550 grams of starch and 2.5 grams of hydroquinone until an even distribution was obtained. Then 87.5 grams polyvinylpyrrolidone and 25 grams of magnesium stearate were added and mixed. The powder was granulated by customary methods and then compressed with a die to yield tablets weighing 100 mg. and containing 10 mg. of the active alkaloid component. The tablets were coated with sugar in a coating pan by customary methods to obtain sugar-coated tablets weighing 200 mg. each.

EXAMPLE 3

A parenteral solution was prepared containing the following ingredients:

| Ingredient: | Amount, mg. |
| --- | --- |
| Glaziovine | 500 |
| Ascorbic acid | 300 |
| Distilled water q.s., ad 100 cc. | |

The glaziovine was suspended in 50 cc. of the distilled water and the ascorbic acid dissolved in 20 cc. distilled water was added to the suspension which was then stirred until complete solution occurred. The obtained solution was diluted to exactly 100 ml. with distilled water, filtered and then distributed in ampules of 2 cc. under a nitrogen atmosphere. The ampules were sterilized at 115° C. for 20 minutes.

What is claimed is:

1. In a process for obtaining glaziovine alkaloid the improvement which consists of extracting alkaloid-containing crushed parts of plants of *Ocotea glaziovii* with a lower alkanol selected from the group consisting of methanol, ethanol, and propanol, evaporating to a residue of syrupy consistency, treating the residue with a dilute alkanoic acid containing from 1 to 3 carbon atoms until the alkaloid is completely extracted therefrom, filtering the acid extract, adjusting the acid extract to a pH of 8–9 with a base, extracting the alkaloid therefrom with chloroform, washing the chloroform extracts with water, drying the extracts over anhydrous sodium sulfate, concentrating the extracts by evaporation, extracting the alkaloid from the concentrated chloroform extract with dilute alkanoic acid, adjusting the acid extract to a pH of 8–9 with a base, extracting the alkaloid from the acid extract successively with chloroform, washing the chloroform extracts with water, drying the washed extracts over anhydrous sodium sulfate and evaporating the extracts to dryness in vacuo to obtain said alkaloid.

2. The process as claimed in claim 1 wherein said residue of syrupy consistency is treated successively with said dilute alkanoic acid until the alkaloid has been extracted completely from the residue as indicated by Mayer reagent.

3. The process as claimed in claim 1 further consisting of washing the dried alkaloid with boiling ether, separating the ether phase from the residue, dissolving the residue in hot methanol in an inert gas atmosphere, and recovering the alkaloid from the methanol solution by crystallization.

4. The process as claimed in claim 3 wherein said methanol solution is cooled to about 0° C. and the obtained crystallized alkaloid is purified by recrystallization from a chloroform-acetone solution having a chloroform:acetone ratio of 1:2 by volume.

References Cited

Gilbert et al., Journal of the American Chemical Society, vol. 86, pp. 694–96 (1964).

ALAN L. ROTMAN, Primary Examiner

U.S. Cl. X.R.

260—289 R, 297 F; 424—258